United States Patent
Lin et al.

(10) Patent No.: US 11,655,106 B2
(45) Date of Patent: May 23, 2023

(54) REMOTE CONTROL BULK MATERIAL MONITORING AND DELIVERY SYSTEM

(71) Applicant: Halliburton Energy Services, Inc., Houston, TX (US)

(72) Inventors: Kristen Lin, Houston, TX (US); Derek Abel, Duncan, OK (US); Derek Williams, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 363 days.

(21) Appl. No.: 17/017,310

(22) Filed: Sep. 10, 2020

(65) Prior Publication Data
US 2022/0073288 A1   Mar. 10, 2022

(51) Int. Cl.
*B65G 53/12*   (2006.01)
*B65G 53/16*   (2006.01)
(Continued)

(52) U.S. Cl.
CPC ............. *B65G 53/16* (2013.01); *B01F 33/84* (2022.01); *B01F 35/2112* (2022.01); *B01F 35/2113* (2022.01); *B28C 7/062* (2013.01); *B65D 88/66* (2013.01); *B65G 3/04* (2013.01); *B01F 2101/28* (2022.01); *B65G 2203/042* (2013.01)

(58) Field of Classification Search
None
See application file for complete search history.

(56) References Cited

U.S. PATENT DOCUMENTS 1,707,653 A * 4/1929 Bushnell ............... B65G 53/32
                                                    406/146
2,115,023 A * 4/1938 Kennedy ............... B65G 53/12
                                                    406/137
(Continued)

FOREIGN PATENT DOCUMENTS

CN        105922438 A  *  9/2016   ............... B28C 5/06
DE        1534982 A1  *  10/1969
(Continued)

OTHER PUBLICATIONS

International Search Report and Written Opinion issued in related PCT Application No. PCT/US2021/044392 dated Dec. 3, 2021, 11 pages.

*Primary Examiner* — Joseph A Dillon, Jr.
(74) *Attorney, Agent, or Firm* — John Wustenberg; Parker Justiss, P.C.

(57) ABSTRACT

The disclosure provides a system comprising one or more supply tanks; a central cement mixing unit; a support unit comprising a compressor and a power supply; a first valve disposed upstream of each of the one or more supply tanks; a second valve disposed downstream of each of the one or more supply tanks; a controller disposed at the central cement mixing unit; and a secondary controller disposed at each of the one or more supply tanks; wherein the one or more supply tanks are coupled to the central cement mixing unit, wherein the compressor is coupled to each of the one or more supply tanks, wherein the power supply is coupled to the compressor and to each of the one or more supply tanks, wherein the controller is communicatively coupled to each of the secondary controllers and to the support unit.

9 Claims, 4 Drawing Sheets

(51) Int. Cl.
*B65G 3/04* (2006.01)
*B65D 88/66* (2006.01)
*B28C 7/06* (2006.01)
*B01F 33/84* (2022.01)
*B01F 35/21* (2022.01)
*B01F 101/28* (2022.01)

(56) References Cited

U.S. PATENT DOCUMENTS

| | | | | | |
|---|---|---|---|---|---|
| 2,919,159 | A | * | 12/1959 | Lacroix | B65G 53/00 |
| | | | | | 406/137 |
| 3,001,829 | A | * | 9/1961 | De Saint-Martin | B65G 53/12 |
| | | | | | 406/146 |
| 3,179,378 | A | * | 4/1965 | Zenz | B65G 53/22 |
| | | | | | 118/DIG. 5 |
| 3,288,537 | A | * | 11/1966 | Roberta | B65G 53/00 |
| | | | | | 406/120 |
| 3,671,079 | A | * | 6/1972 | Huffaker | B65G 53/12 |
| | | | | | 406/137 |
| 3,830,548 | A | * | 8/1974 | Sem | B65G 53/12 |
| | | | | | 406/137 |
| 3,858,943 | A | * | 1/1975 | Bose | B65G 53/12 |
| | | | | | 406/137 |
| 3,905,650 | A | * | 9/1975 | Freeman | B65G 53/12 |
| | | | | | 406/146 |
| 4,088,373 | A | * | 5/1978 | White | B65D 88/72 |
| | | | | | 406/146 |
| 4,223,044 | A | * | 9/1980 | Se | B65D 88/706 |
| | | | | | 366/101 |
| 4,367,987 | A | * | 1/1983 | Walters | B01F 35/60 |
| | | | | | 406/146 |
| 4,493,593 | A | * | 1/1985 | Schlimbach | B65G 53/16 |
| | | | | | 406/146 |
| 4,834,590 | A | * | 5/1989 | Schneider | B65G 53/50 |
| | | | | | 406/142 |
| 4,883,390 | A | * | 11/1989 | Reintjes | B65G 53/12 |
| | | | | | 406/137 |
| 5,244,317 | A | * | 9/1993 | Kuboyama | B24C 7/0038 |
| | | | | | 406/146 |
| 5,618,136 | A | * | 4/1997 | Smoot | B65G 53/06 |
| | | | | | 406/146 |
| 6,700,503 | B2 | | 3/2004 | Masar et al. | |
| 6,922,144 | B2 | | 7/2005 | Bulin et al. | |
| 7,926,564 | B2 | * | 4/2011 | Phillippi | E21B 21/062 |
| | | | | | 166/267 |
| 7,937,216 | B2 | | 5/2011 | Humphrey et al. | |
| 8,087,851 | B1 | * | 1/2012 | Jarvis | B65G 53/34 |
| | | | | | 406/137 |
| 8,337,122 | B2 | * | 12/2012 | Schultz | B65G 53/66 |
| | | | | | 406/137 |
| 8,412,473 | B2 | | 4/2013 | Woltring et al. | |
| 9,933,791 | B2 | | 4/2018 | Lucas et al. | |
| 10,202,835 | B2 | | 2/2019 | Hayworth et al. | |
| 10,401,246 | B2 | * | 9/2019 | Spaulding | G01L 13/02 |
| 11,266,958 | B2 | * | 3/2022 | Bishop | B01F 33/5013 |
| 11,273,421 | B2 | * | 3/2022 | Stegemoeller | B01F 35/7544 |
| 11,453,146 | B2 | * | 9/2022 | Luharuka | B29B 7/60 |
| 2005/0219942 | A1 | * | 10/2005 | Wallgren | B28C 7/0076 |
| | | | | | 366/30 |
| 2019/0134850 | A1 | | 5/2019 | Cline et al. | |
| 2020/0338511 | A1 | * | 10/2020 | Nelson | B28C 5/4268 |
| 2021/0308638 | A1 | * | 10/2021 | Zhong | B01F 23/59 |
| 2022/0134599 | A1 | * | 5/2022 | Cline | G01S 13/88 |
| | | | | | 366/8 |

FOREIGN PATENT DOCUMENTS

| | | | |
|---|---|---|---|
| FR | 1045210 A | * | 12/1951 |
| JP | 59057818 A | * | 3/1984 |
| JP | H08-332368 A | | 12/1996 |
| JP | 2002-337131 A | | 11/2002 |
| KR | 20-0346181 Y | | 3/2004 |
| KR | 10-1991225 B1 | | 6/2019 |

* cited by examiner

US 11,655,106 B2

REMOTE CONTROL BULK MATERIAL MONITORING AND DELIVERY SYSTEM

TECHNICAL FIELD OF THE INVENTION

The present disclosure relates generally to cementing operations and, more particularly, to systems and methods for monitoring and distributing bulk material to a central cement unit for mixing.

BACKGROUND

As part of some cement mixing operations, a cement supply tank provides dry cement to the cement mixer. In conventional systems of this type, interruptions can occur in the dry cement delivery rate. Sometimes these interruptions can be caused by an insufficient supply of dry cement to the cement supply tank. These interruptions can also be caused by an excessive supply of dry cement to the cement supply tank, such that the supply tank becomes packed off and cement fails to leave the cement supply tank. In such a situation, the cement mixer will sometimes receive periodic slugs of cement, and at other times, no cement at all. Interruptions in the cement delivery rate from the cement supply tank to the cement mixer can result in cement with inconsistent or incorrect density, no cement production at all, or otherwise substandard cement production quality. Further, more than one supply tank can be used to monitor overfill of the first supply tank. A singular operator is often monitoring the transfer of material between tanks and operating the necessary valves. When cement delivery is inadequate, an operator has to slow down or stop the cement mixing operation until adequate cement delivery resumes. Thus, current systems can result in inefficiencies, substandard cement production quality, damaged equipment, or other costs.

Figure 1:
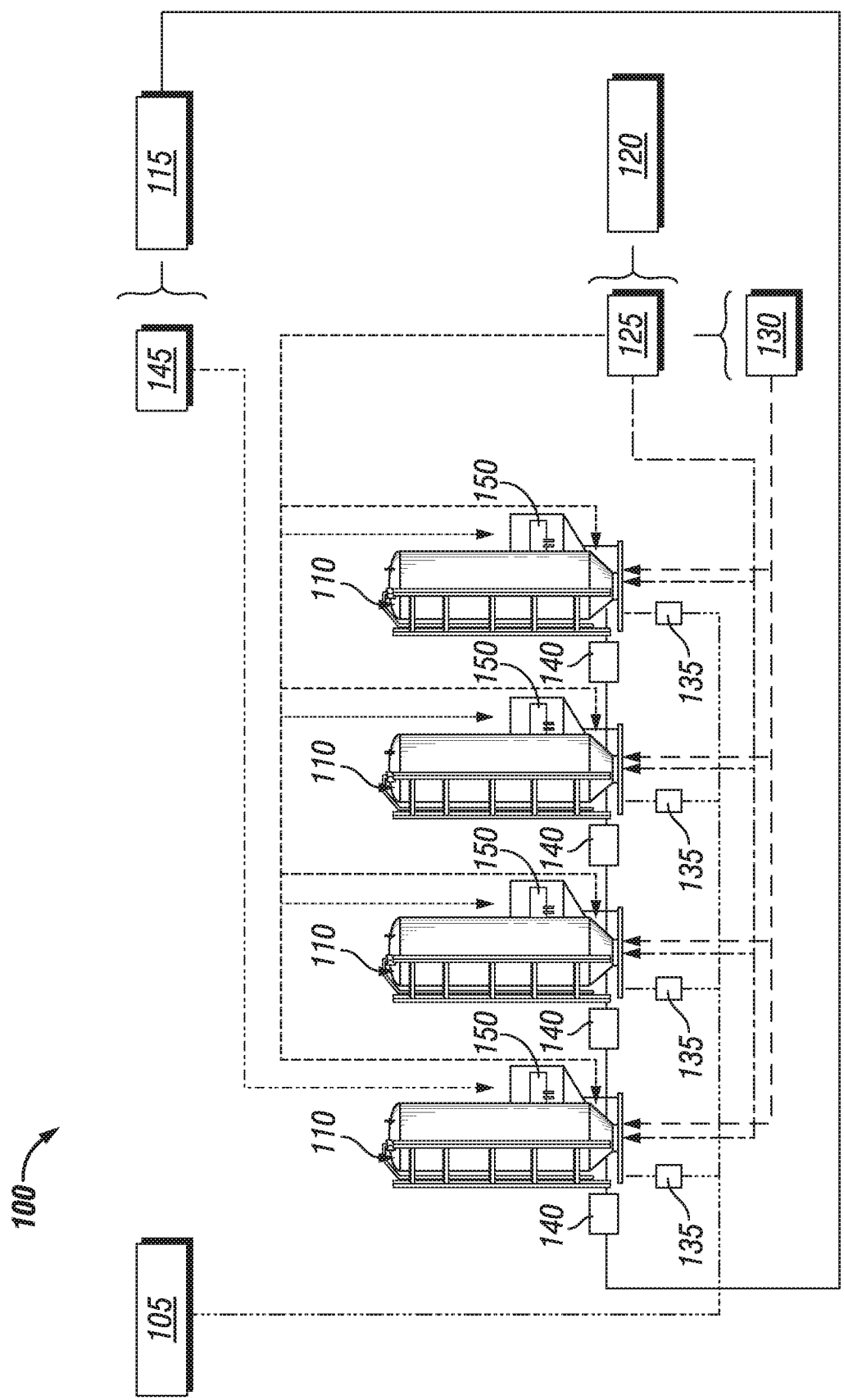
FIG. 1 is a schematic diagram of a remote-control bulk material handling system, according to one or more aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time consuming but would nevertheless be a routine undertaking for those of ordinary skill in the art having the benefit of the present disclosure.

Throughout this disclosure, a reference numeral followed by an alphabetical character refers to a specific instance of an element and the reference numeral alone refers to the element generically or collectively. Thus, as an example (not shown in the drawings), widget "1a" refers to an instance of a widget class, which may be referred to collectively as widgets "1" and any one of which may be referred to generically as a widget "1". In the figures and the description, like numerals are intended to represent like elements.

To facilitate a better understanding of the present disclosure, the following examples of certain embodiments are given. In no way should the following examples be read to limit, or define, the scope of the disclosure. Embodiments described below with respect to one implementation are not intended to be limiting.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

The terms "couple" or "couples," as used herein, are intended to mean either an indirect or direct connection. Thus, if a first device couples to a second device, that connection may be through a direct connection, or through an indirect electrical connection or a shaft coupling via other devices and connections.

The present disclosure provides for systems and methods for monitoring the distribution and delivery of bulk material from one or more supply tanks to a central cement unit mixer. The provided systems and methods may be able to provide for an operator to control the remote-control bulk material handling system from an information handling system disposed about the central cement unit mixer. In one or more embodiments, the disclosed systems and methods provide for an accurate feedback of the status of the components operating for remote monitoring and actuation.

FIG. 1 is a schematic diagram of a remote-control bulk material handling system 100. Generally, remote-control bulk material handling system 100 illustrates a system for transferring bulk material from one or more supply tanks 110 to a central cement mixing unit 115. In one or more embodiments, the remote-control bulk material handling system 100 may be disposed at or near a well site, wherein the well site may be located over a hydrocarbon bearing formation, which may be located below a ground surface. As illustrated, a dry bulk trailer 105 may be coupled to the one or more supply tanks 110. The dry bulk trailer 105 may be configured to deliver the dry bulk material to the well site for preparation of a cementing operation. In embodiments, any suitable number of supply tanks 110 may be incorporated into the remote-control bulk material handling system 100. During operations, each of the one or more supply tanks 110 may comprise different dry bulk material to produce different cements. In one or more embodiments, a portion of the one or more supply tanks 110 may comprise the same dry bulk material as each other and may serve to store overfill from a first one of the one or more supply tanks 110. As shown, the one or more supply tanks 110 may be configured to supply at least a portion of the dry bulk material contained within each of them to the central cement mixing unit 115. In embodiments, the central cement mixing unit 115 may be configured to mix the received dry bulk material with water and/or any other suitable fluids to produce the mixed cement.

In one or more embodiments, the remote-control bulk material handling system 100 may further comprise a support unit 120 comprising a compressor 125 and a power supply 130. The support unit 120 may be any suitable equipment capable of delivering ancillary equipment, such as the compressor 125 and the power supply 130, to the well site. The compressor 125 may be coupled to each of the one or more supply tanks 110 and may be configured to supply air from a location at or near the bottom of each of the one or more supply tanks 110 for pressurization and/or aeration of each of the supply tanks 110. In embodiments, the compressor 125 may prevent compaction of the dry bulk material contained in each of the one or more supply tanks 110. In one or more embodiments, the compressor 125 may be configured to provide air that flows into the top of each of the one or more supply tanks 110, thereby increasing the pressure within the one or more supply tanks 110 for discharge near the bottom of each of the one or more supply tanks 110. In further embodiments, the compressor 125 may be configured to provide air that flows into the bottom of each of the one or more supply tanks 110 for aeration, thereby mixing the air with the dry bulk material in order for the dry bulk material to be able to perform more like a fluid to flow out as discharge. The power supply 130 may be coupled to each of the one or more supply tanks 110 and may be configured to supply power to any suitable electronic components coupled to each of the one or more supply tanks 110. Without limitations, the power supply 130 may be configured to supply power to sensors, solenoids, and the like. In embodiments, the power supply 130 may further be configured to supply power to the compressor 125.

In one or more embodiments, there may be a first valve 135 disposed upstream of the inflow into each of the one or more supply tanks 110 configured to control the flow of the dry bulk material from the dry bulk trailer 105 to each of the one or more supply tanks 110. In one or more embodiments, there may be a second valve 140 disposed downstream of the outflow out of each of the one or more supply tanks 110 configured to control the flow of the dry bulk material from each of the one or more supply tanks 110 to the central cement mixing unit 115. In at least one embodiment, operation of each of the first valve 135 and/or the second valve 140 may be based on signals received from a controller 145. Without limitations, there may be a plurality of valves configured to control one of the one or more supply tanks 110 in addition to first valve 135 and second valve 140. In one or more embodiments, the plurality of valves (not shown) may be used for aeration, purging, discharge, and any combinations thereof, wherein the controller 145 may be communicatively coupled to each of the plurality of valves to control the plurality of valves.

In one or more embodiments, the controller 145 may be disposed at the central cement mixing unit 115. Without limitations, the controller 145 may be any suitable controller. In one or more embodiments, controller 145 may be directly or indirectly coupled to any one or more components of the remote-control bulk material handling system 100. In embodiments, each of the one or more supply tanks 110 may comprise a secondary controller 150, wherein each or the secondary controllers 150 may be communicatively coupled to the controller 145 disposed at the central cement mixing unit 115 and/or to each other. Without limitations, the connection between the controller 145 and the secondary controllers 150 may be wired or wireless over a network. In alternate embodiments, controller 145 may be located remotely from the remote-control bulk material handling system 100. During operations, the controller 145 may be configured to monitor and operate the remote-control bulk material handling system 100 by sending signals to the secondary controllers 150 to actuate certain components related to each of the one or more supply tanks 110 (for example, the first valve 135 and the second valve 140). The controller 145 may further be communicatively coupled to the support unit 120 and may be configured to actuate the support unit 120.

Figure 2:
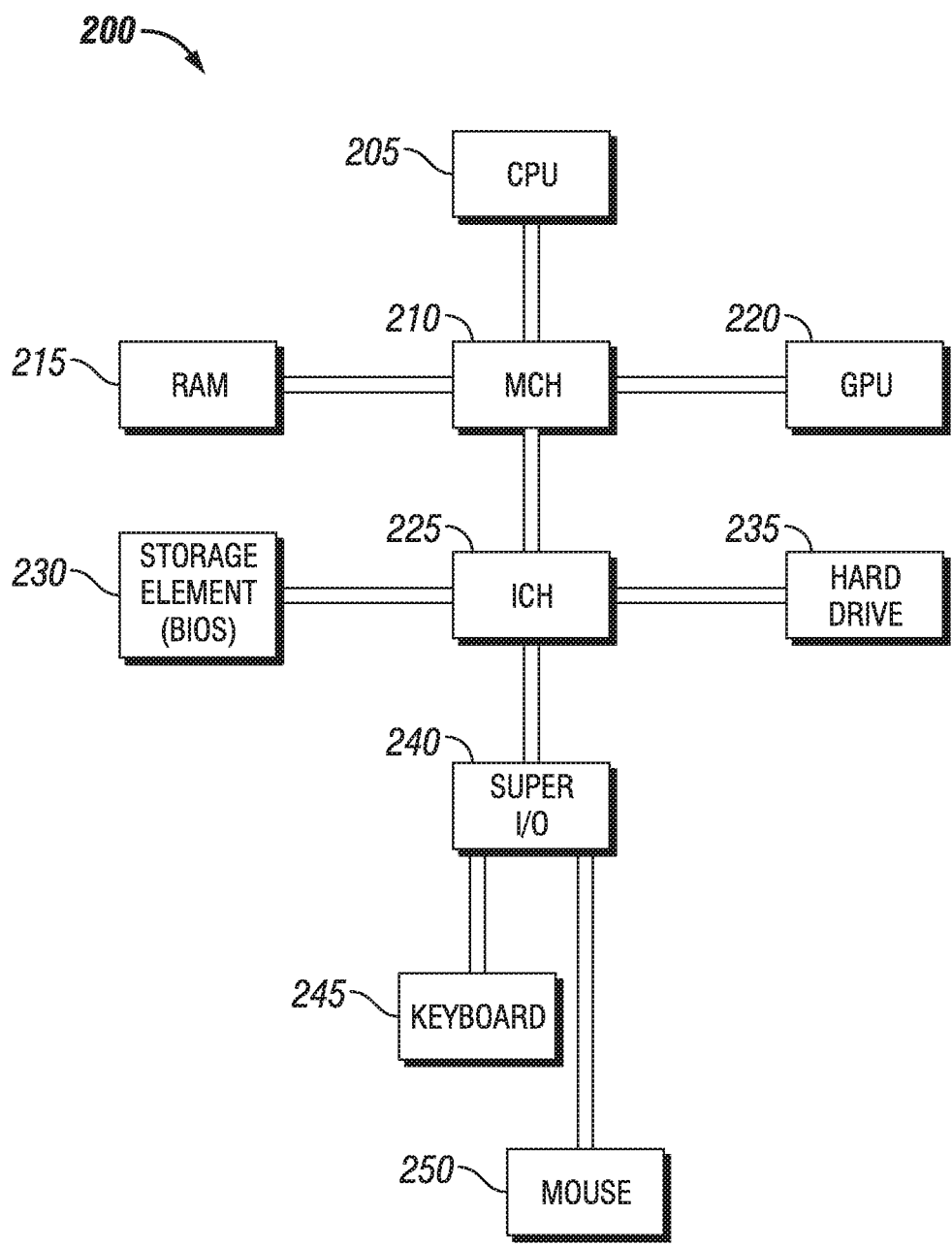
FIG. 2 is a diagram illustrating an example information handling system, according to aspects of the present disclosure.

FIG. 2 is a diagram illustrating an example information handling system 200, according to aspects of the present disclosure. The controller 145 (referring to FIG. 1) may take a form similar to the information handling system 200 or include one or more components of information handling system 200. A processor or central processing unit (CPU) 205 of the information handling system 200 is communicatively coupled to a memory controller hub or north bridge 210. The processor 205 may include, for example a microprocessor, microcontroller, digital signal processor (DSP), application specific integrated circuit (ASIC), or any other digital or analog circuitry configured to interpret and/or execute program instructions and/or process data. Processor 205 may be configured to interpret and/or execute program instructions or other data retrieved and stored in any memory such as memory 215 or hard drive 235. Program instructions or other data may constitute portions of a software or application for carrying out one or more methods described herein. Memory 215 may include read-only memory (ROM), random access memory (RAM), solid state memory, or disk-based memory. Each memory module may include any system, device or apparatus configured to retain program instructions and/or data for a period of time (e.g., computer-readable non-transitory media). For example, instructions from a software or application may be retrieved and stored in memory 215 for execution by processor 205.

Modifications, additions, or omissions may be made to FIG. 2 without departing from the scope of the present disclosure. For example, FIG. 2 shows a particular configuration of components of information handling system 200. However, any suitable configurations of components may be used. For example, components of information handling system 200 may be implemented either as physical or logical components. Furthermore, in some embodiments, functionality associated with components of information handling system 200 may be implemented in special purpose circuits or components. In other embodiments, functionality associated with components of information handling system 200 may be implemented in configurable general-purpose circuit or components. For example, components of information handling system 200 may be implemented by configured computer program instructions.

Memory controller hub (MCH) 210 may include a memory controller for directing information to or from various system memory components within the information handling system 200, such as memory 215, storage element 230, and hard drive 235. The memory controller hub 210 may be coupled to memory 215 and a graphics processing unit (GPU) 220. Memory controller hub 210 may also be coupled to an I/O controller hub (ICH) or south bridge 225. I/O controller hub 225 is coupled to storage elements of the information handling system 200, including a storage element 230, which may comprise a flash ROM that includes a basic input/output system (BIOS) of the computer system. I/O controller hub 225 is also coupled to the hard drive 235 of the information handling system 200. I/O controller hub 225 may also be coupled to a Super I/O chip 240, which is itself coupled to several of the I/O ports of the computer system, including keyboard 245 and mouse 250.

In certain embodiments, the controller 145 may comprise an information handling system 200 with at least a processor and a memory device coupled to the processor that contains a set of instructions that when executed cause the processor to perform certain actions. In any embodiment, the information handling system may include a non-transitory computer readable medium that stores one or more instructions where the one or more instructions when executed cause the processor to perform certain actions. As used herein, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a computer terminal, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system 200 may also include one or more buses operable to transmit communications between the various hardware components.

Figure 3:
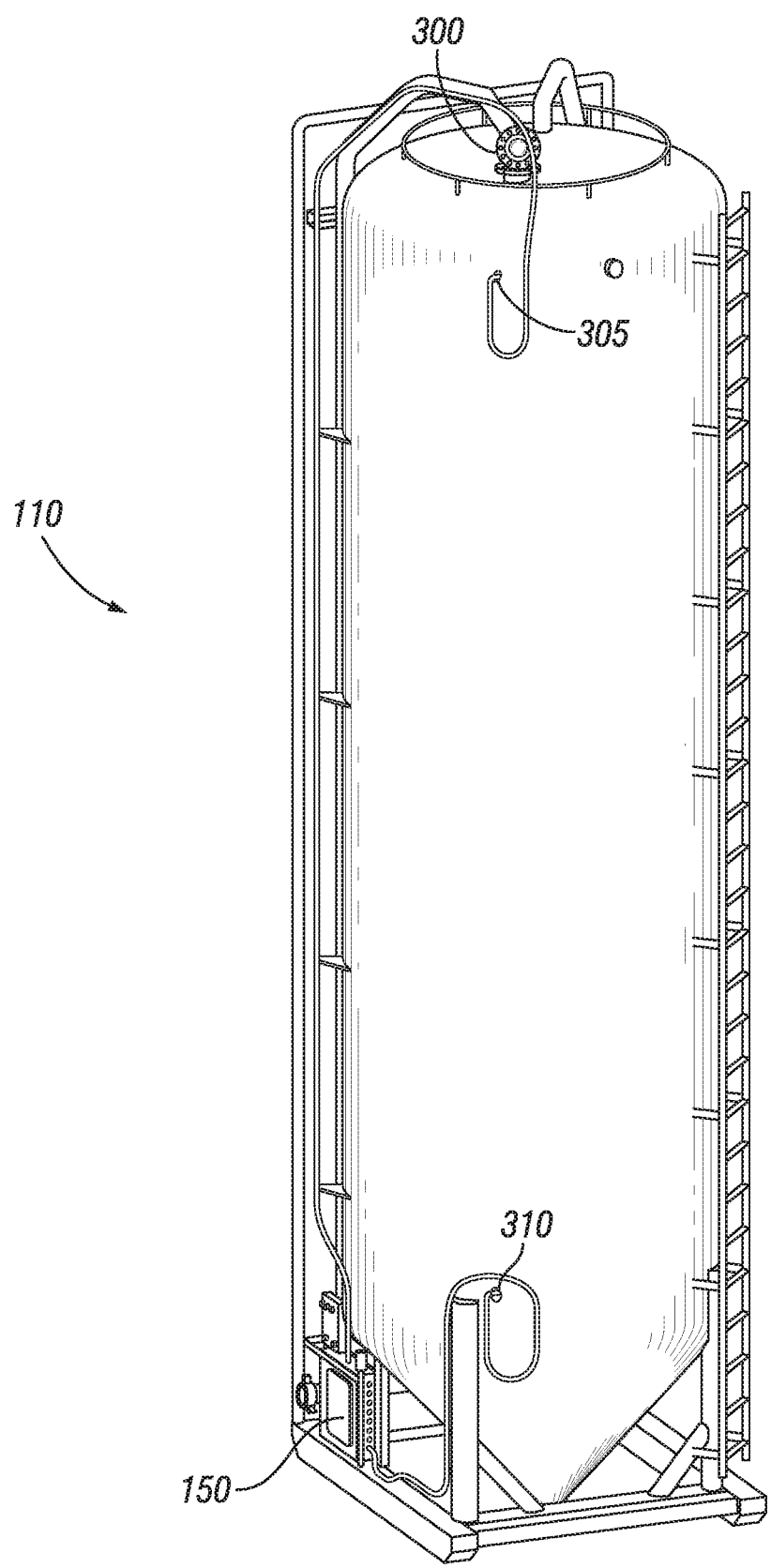
FIG. 3 is a schematic diagram of a supply tank, according to one or more aspects of the present disclosure.

FIG. 3 illustrates an exemplary embodiment of one of the one or more supply tanks 110. In one or more embodiments, the one or more supply tanks 110 may be any suitable size, height, shape, and combinations thereof. In some embodiments, each of the one or more supply tanks 110 may comprise the same or uniform shape. In other embodiments, the one or more supply tanks 110 may comprise different dimensions from each other.

As illustrated, each of the one or more supply tanks 110 may comprise a radar sensor 300, a first vibrational sensor 305, and a second vibrational sensor 310. The radar sensor 300 may be disposed on top of the one of the one or more supply tanks 110 and configured to measure a height of the bulk material within the one or more supply tanks 110. In embodiments, the radar sensor 300 may operate to provide continuous measurements of the height of the bulk material. The first vibrational sensor 305 and the second vibrational sensor 310 may be disposed about the one of the one or more supply tanks 110. As illustrated, the first vibrational sensor 305 may be disposed near a top end of the one of the one or more supply tanks 110, and the second vibrational sensor 310 may be disposed near a bottom end of the one of the one or more supply tanks 110. In one or more embodiments, both the first vibrational sensor 305 and the second vibrational sensor 310 may be configured to vibrate to dislodge any dry bulk material stuck along the inside walls of the one or more supply tanks 110. In embodiments, both the first vibrational sensor 305 and the second vibrational sensor 310 may operate continuously, as long as power is provided. In one or more embodiments, both the first vibrational sensor 305 and the second vibrational sensor 310 may be configured to detect a change in frequency as particles of the dry bulk material come into contact with a portion of the first vibrational sensor 305 or the second vibrational sensor 310. The change in frequency may be transmitted to the controller 145 (referring to FIG. 1) for further operations. In one or more embodiments, there may be a pressure sensor (not shown) disposed about each of the one or more supply tanks 110 configured to measure a pressure within the one or more supply tanks 110.

In one or more embodiments, the secondary controller 150 may be communicatively coupled to the radar sensor 300, the first vibrational sensor 305, and the second vibrational sensor 310. Without limitations, the secondary controller 150 may be disposed at any suitable location on the one of the one or more supply tanks 110. The secondary controller 150 may be configured to receive measurements from these aforementioned sensors and may communicate these measurements to the controller 145 (referring to FIG. 1). During operations, the secondary controller 150 may instruct a corresponding first valve 135 (referring to FIG. 1) and/or a corresponding second valve 140 (referring to FIG. 1) for each one of the one or more supply tanks 110 to open and close. In one or more embodiments, the instructions for actuation may include actuating either of the valves to open or close fully or partially, wherein the valve is in a state in between open and closed. In embodiments, the secondary controller 150 may further instruct the compressor 125 (referring to FIG. 1) to pressurize and/or aerate the one of the one or more supply tanks 110. Example operations of the remote-control bulk material handling system 100 are described in greater detail below, with reference to FIG. 4.

Figure 4:
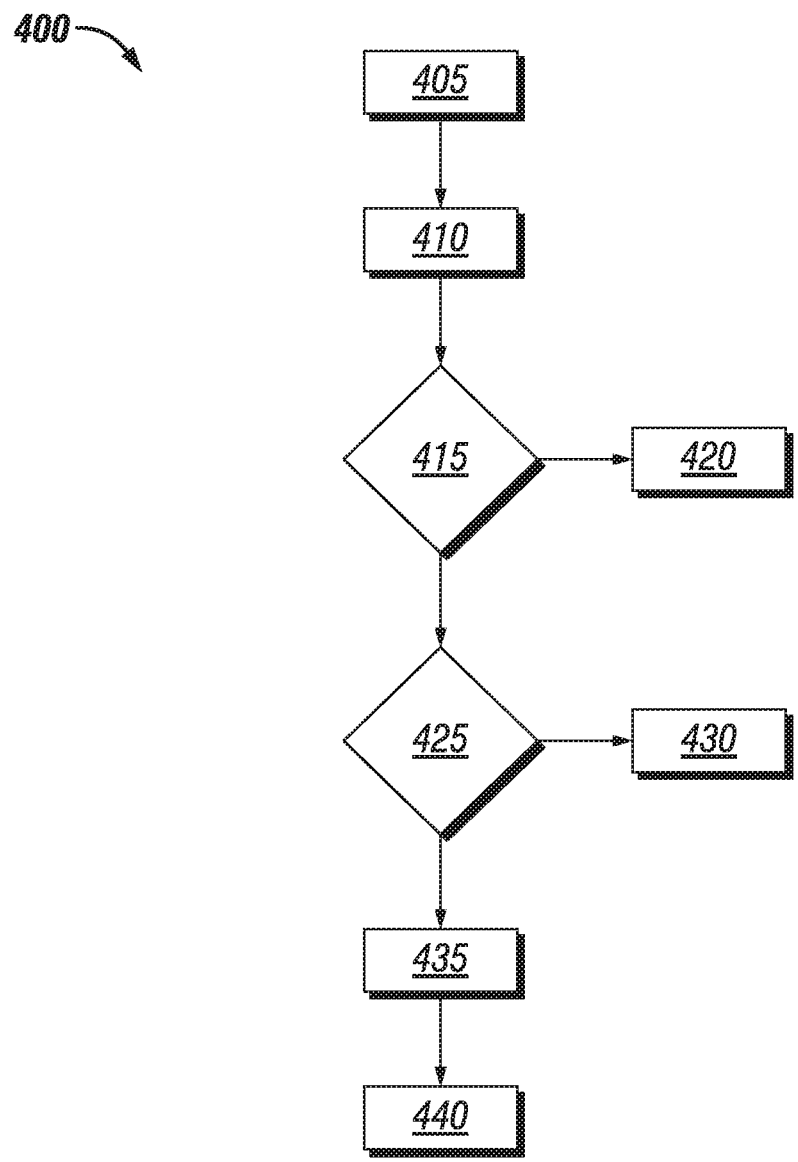
FIG. 4 is a diagram illustrating a method of operating a remote-control bulk material handling system, according to aspects of the present disclosure.

FIG. 4 illustrates a flowchart describing a methodology 400 of operations with the remote-control bulk material handling system 100 (referring to FIG. 1). At a step 405, the radar sensor 300 (referring to FIG. 3), the first vibrational sensor 305 (referring to FIG. 3), the second vibrational sensor 310 (referring to FIG. 3), and combinations thereof may measure a height of the dry bulk material present within one of the one or more supply tanks 110 (referring to FIG. 1). The secondary controller 150 (referring to FIG. 1) communicatively coupled to that one of the one or more supply tanks 110 may store, process, display, manipulate, and combinations thereof the measurements acquired by the radar sensor 300, the first vibrational sensor 305, the second vibrational sensor 310, and combinations thereof. At a step 410, the secondary controller 150 may transmit those measurements to the controller 145 (referring to FIG. 1) via a connection that is wired, wireless, and combinations thereof. In one or more embodiments, step 405 and/or step 410 may be repeated by each of the one or more supply tanks 110. Once the controller 145 has received the measurements from the one or more supply tanks 110, the controller 145 may store, process, display, manipulate, and combinations thereof the measurements for further operations monitored by an operator.

In one or more embodiments, at a step 415, the controller 145 may determine whether or not the dry bulk material within one of the one or more supply tanks 110 is running low or below a threshold. In alternate embodiments, the secondary controller 150 associated with that one of the one or more supply tanks 110 may determine whether or not the dry bulk material within one of the one or more supply tanks 110 is running low and may communicate the condition of that supply tank 110 to the controller 145. If the dry bulk material within one of the one or more supply tanks 110 is running low, the controller 145 may display a message to the operator indicating that the dry bulk material is low in that supply tank 110 at a step 420. If the dry bulk material within one of the one or more supply tanks 110 is not running low, the controller 145 may determine whether or not the dry bulk material within one of the one or more supply tanks 110 is exceeding a maximum amount for that designated one of the one or more supply tanks in a step 425.

In alternate embodiments, the secondary controller 150 associated with that one of the one or more supply tanks 110 may determine whether or not the dry bulk material within one of the one or more supply tanks 110 is exceeding a maximum amount and may communicate the condition of that supply tank 110 to the controller 145. If the dry bulk material within one of the one or more supply tanks 110 is exceeding a maximum amount, the controller 145 may display a message to the operator indicating that there is too much dry bulk material in that supply tank 110 at a step 430.

At a step 435, the controller 145 may transmit instruction to the secondary controller 150 of a designated one of the one or more supply tanks 110. Without limitations, the instructions may instruct the secondary controller 150 to actuate the compressor 125 (referring to FIG. 1) to provide pressurization and/or aeration to the one of the one or more supply tanks 110, to actuate the first valve 135 (referring to FIG. 1) and/or the second valve 140 (referring to FIG. 1) to open or close to allow for the dry bulk material to flow into and/or out of the one of the one or more supply tanks 110, and combinations thereof.

At a step 440, the controller 145 may further transmit instructions to the central cement mixing unit 115 (referring to FIG. 1) to actuate the central cement mixing unit 115.

In one or more embodiments, the controller 145 may display the status of each of the one or more supply tanks 110. Without limitations, the controller 145 may further display whether the dry bulk material within each of the supply tanks 110 is running low and/or above a maximum value, which of the one or more supply tanks 110 are operating to supply the central cement mixing unit 115 (referring to FIG. 1) with dry bulk material, whether the compressor 140 is pressurizing and/or aerating the one or more supply tanks 110, whether respective first valve 135 and/or second valves 140 are open or closed, and combinations thereof. In one or more embodiments, the controller 145 may further display a location within the remote-control bulk material handling system 100 where there is a failure of one of the components for the operator to manually override, inspect, and/or replace.

An embodiment of the present disclosure is a remote-control bulk material handling system, comprising: one or more supply tanks, a central cement mixing unit, a support unit comprising a compressor and a power supply, a first valve disposed upstream of each of the one or more supply tanks, a second valve disposed downstream of each of the one or more supply tanks, a controller disposed at the central cement mixing unit, and a secondary controller disposed at each of the one or more supply tanks, wherein the one or more supply tanks are coupled to the central cement mixing unit, wherein the compressor is coupled to a bottom and a top of each of the one or more supply tanks, wherein the power supply is coupled to the compressor and to each of the one or more supply tanks, wherein the controller is communicatively coupled to each of the secondary controllers and to the support unit.

In one or more embodiments described in the preceding paragraph, wherein there is dry bulk material disposed within at least a portion of the one or more supply tanks. In one or more embodiments described above, wherein the one or more supply tanks contain the same dry bulk material. In one or more embodiments described above, wherein the one or more supply tanks contain various dry bulk material. In one or more embodiments described above, wherein each of the one or more supply tanks comprises a pressure sensor, wherein the pressure sensor is configured to measure an internal pressure within each of the one or more supply tanks. In one or more embodiments described above, wherein each of the one or more supply tanks comprises a radar sensor, a first vibrational sensor, and a second vibrational sensor. In one or more embodiments described above, wherein the radar sensor is disposed on top of the one of the one or more supply tanks and configured to measure a height of dry bulk material contained within the one or more supply tanks. In one or more embodiments described above, wherein the first vibrational sensor is disposed near a top end of the one or more supply tanks, and wherein the second vibrational sensor is disposed near a bottom end of the one or more supply tanks. In one or more embodiments described above, wherein the secondary controller of each of the one or more supply tanks is communicatively coupled to each of the radar sensor, the first vibrational sensor, and the second vibrational sensor.

Another embodiment of the present disclosure is a method, comprising: measuring a height of dry bulk material disposed within one or more supply tanks, transmitting the measurements of the height of the dry bulk material to a controller, transmitting instructions to a compressor to pressurize or aerate at least one of the one or more supply tanks, transmitting instructions from the controller to a secondary controller disposed at each of the one or more supply tanks to: actuate a first valve disposed upstream of each of the one or more supply tanks and actuate a second valve disposed downstream of each of the one or more supply tanks, and actuating a first vibrational sensor and a second vibrational sensor disposed at each of the one or more supply tanks to dislodge dry bulk material stuck along the inside walls of the one or more supply tanks.

In one or more embodiments described in the preceding paragraph, further comprising pressurizing at least one of the one or more supply tanks by providing air to flow into a top of the at least one of the one or more supply tanks to increase the pressure within the at least one of the one or more supply tanks. In one or more embodiments described above, further comprising aerating at least one of the one or more supply tanks by providing air to flow into a bottom of the at least one of the one or more supply tanks to mix the air with the dry bulk material within the at least one of the one or more supply tanks. In one or more embodiments described above, further comprising actuating the first valve of at least one of the one or more supply tanks. In one or more embodiments described above, further comprising actuating the second valve of at least one of the one or more supply tanks. In one or more embodiments described above, further comprising measuring an internal pressure of the one or more supply tanks. In one or more embodiments described above, further comprising determining, by the controller, whether the dry bulk material within one of the one or more supply tanks is below a threshold, and displaying the status that the dry bulk material within the one of the one or more supply tanks is below the threshold. In one or more embodiments described above, further comprising determining, by the controller, whether the dry bulk material within one of the one or more supply tanks is exceeding a maximum threshold, and displaying the status that the dry bulk material within the one of the one or more supply tanks is exceeding the maximum threshold. In one or more embodiments described above, further comprising flowing dry bulk material from at least one of the one or more supply tanks to a central cement mixing unit. In one or more embodiments described above, wherein the controller is configured to transmit the instructions to the compressor. In one or more embodiments described above, wherein at least one of the secondary controllers is configured to transmit the instructions to the compressor.

Unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A remote-control bulk material handling system, comprising:
   one or more supply tanks;
   a central cement mixing unit;
   a support unit comprising a compressor and a power supply;
   a first valve disposed upstream of each of the one or more supply tanks;
   a second valve disposed downstream of each of the one or more supply tanks;
   a controller disposed at the central cement mixing unit; and
   a secondary controller disposed at each of the one or more supply tanks;
   wherein the one or more supply tanks are coupled to the central cement mixing unit, wherein the compressor is coupled to a bottom and a top of each of the one or more supply tanks, wherein the power supply is coupled to the compressor and to each of the one or more supply tanks, wherein the controller is communicatively coupled to each of the secondary controllers and to the support unit.

2. The remote-control bulk material handling system of claim 1, wherein there is dry bulk material disposed within at least a portion of the one or more supply tanks.

3. The remote-control bulk material handling system of claim 2, wherein the one or more supply tanks contain the same dry bulk material.

4. The remote-control bulk material handling system of claim 2, wherein the one or more supply tanks contain various dry bulk material.

5. The remote-control bulk material handling system of claim 1, wherein each of the one or more supply tanks comprises a pressure sensor, wherein the pressure sensor is configured to measure an internal pressure within each of the one or more supply tanks.

6. The remote-control bulk material handling system of claim 1, wherein each of the one or more supply tanks comprises a radar sensor, a first vibrational sensor, and a second vibrational sensor.

7. The remote-control bulk material handling system of claim 6, wherein the radar sensor is disposed on top of the one of the one or more supply tanks and configured to measure a height of dry bulk material contained within the one or more supply tanks.

8. The remote-control bulk material handling system of claim 6, wherein the first vibrational sensor is disposed near a top end of the one or more supply tanks, and wherein the second vibrational sensor is disposed near a bottom end of the one or more supply tanks.

9. The remote-control bulk material handling system of claim 6, wherein the secondary controller of each of the one or more supply tanks is communicatively coupled to each of the radar sensor, the first vibrational sensor, and the second vibrational sensor.

\* \* \* \* \*